US012380275B2

(12) United States Patent
Alikaniotis et al.

(10) Patent No.: US 12,380,275 B2
(45) Date of Patent: *Aug. 5, 2025

(54) DETECTING THE TONE OF TEXT

(71) Applicant: Grammarly, Inc., San Francisco, CA (US)

(72) Inventors: Dimitris Alikaniotis, San Francisco, CA (US); Stanislav Levental, San Francisco, CA (US); Alex Shevchenko, Vancouver (CA)

(73) Assignee: GRAMMARLY, INC.

( * ) Notice: Subject to any disclaimer, the term of this patent is extended or adjusted under 35 U.S.C. 154(b) by 0 days.

This patent is subject to a terminal disclaimer.

(21) Appl. No.: 18/318,120

(22) Filed: May 16, 2023

(65) Prior Publication Data
US 2023/0289529 A1    Sep. 14, 2023

Related U.S. Application Data

(63) Continuation of application No. 17/212,957, filed on Mar. 25, 2021, now Pat. No. 11,763,085.

(60) Provisional application No. 63/000,315, filed on Mar. 26, 2020.

(51) Int. Cl.
| G06F 40/289 | (2020.01) |
| G06F 40/211 | (2020.01) |
| G06F 40/253 | (2020.01) |
| G06F 40/35 | (2020.01) |
| G06N 3/049 | (2023.01) |
| G06N 20/00 | (2019.01) |

(52) U.S. Cl.
CPC ......... *G06F 40/289* (2020.01); *G06F 40/211* (2020.01); *G06F 40/253* (2020.01); *G06F 40/35* (2020.01); *G06N 3/049* (2013.01); *G06N 20/00* (2019.01)

(58) Field of Classification Search
CPC .... G06F 40/289; G06F 40/211; G06F 40/253; G06F 40/35; G06N 3/049; G06N 20/00; G06N 3/044
See application file for complete search history.

(56) References Cited

U.S. PATENT DOCUMENTS

| 7,930,302 B2 * | 4/2011 | Bandaru | G06F 16/951 715/810 |
| 10,332,508 B1 * | 6/2019 | Hoffmeister | G06N 3/08 |
| 10,706,450 B1 * | 7/2020 | Tavernier | G06F 16/9535 |
| 10,796,095 B2 * | 10/2020 | Chhaya | G06F 40/211 |
| 2005/0027512 A1 * | 2/2005 | Waise | G06F 40/216 704/9 |
| 2007/0201702 A1 | 8/2007 | Hendricks et al. | |
| 2014/0278914 A1 * | 9/2014 | Gurumoorthy | G06Q 30/0243 705/14.42 |
| 2015/0379336 A1 * | 12/2015 | Hoshi | G06V 30/1456 382/187 |

(Continued)

*Primary Examiner* — Daniel C Washburn
*Assistant Examiner* — Paul J. Mueller
(74) *Attorney, Agent, or Firm* — Van Hoven PC; Jordan Becker

(57) ABSTRACT

In an embodiment, the disclosed technologies are capable of detecting a tone in text. A detected tone may be used to inform a decision made by and/or output produced by a grammatical error correction system. A set of candidate tones may be presented to a user for feedback. User feedback on the candidate tones may be used to improve subsequent tone detections.

20 Claims, 10 Drawing Sheets

(56) References Cited

U.S. PATENT DOCUMENTS

| | | | |
|---|---|---|---|
| 2016/0019201 A1 | 1/2016 | Qian et al. | |
| 2018/0203847 A1* | 7/2018 | Akkiraju | G06F 16/3329 |
| 2018/0285892 A1* | 10/2018 | Brooks | G06Q 30/0201 |
| 2018/0330000 A1 | 11/2018 | Noble et al. | |
| 2019/0018893 A1* | 1/2019 | Weiss | G06F 16/353 |
| 2019/0018900 A1 | 1/2019 | Li et al. | |
| 2019/0121842 A1* | 4/2019 | Catalano | G06F 40/247 |
| 2019/0325068 A1 | 10/2019 | Lai et al. | |
| 2019/0377785 A1* | 12/2019 | N | G06F 40/20 |
| 2020/0089762 A1* | 3/2020 | Fox | G06F 40/166 |
| 2021/0027889 A1* | 1/2021 | Neil | G16H 10/60 |
| 2021/0097240 A1* | 4/2021 | Singh | G06F 40/253 |
| 2021/0271810 A1 | 9/2021 | Nadejde et al. | |
| 2021/0276457 A1 | 9/2021 | Carraro | |
| 2022/0277134 A1* | 9/2022 | Nakamura | G16H 15/00 |

\* cited by examiner

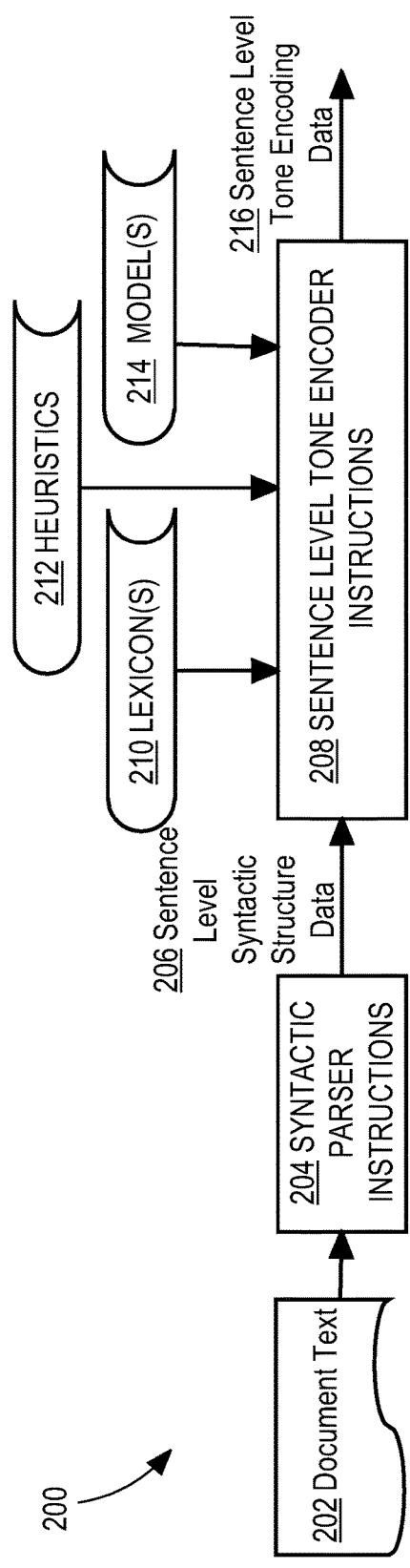
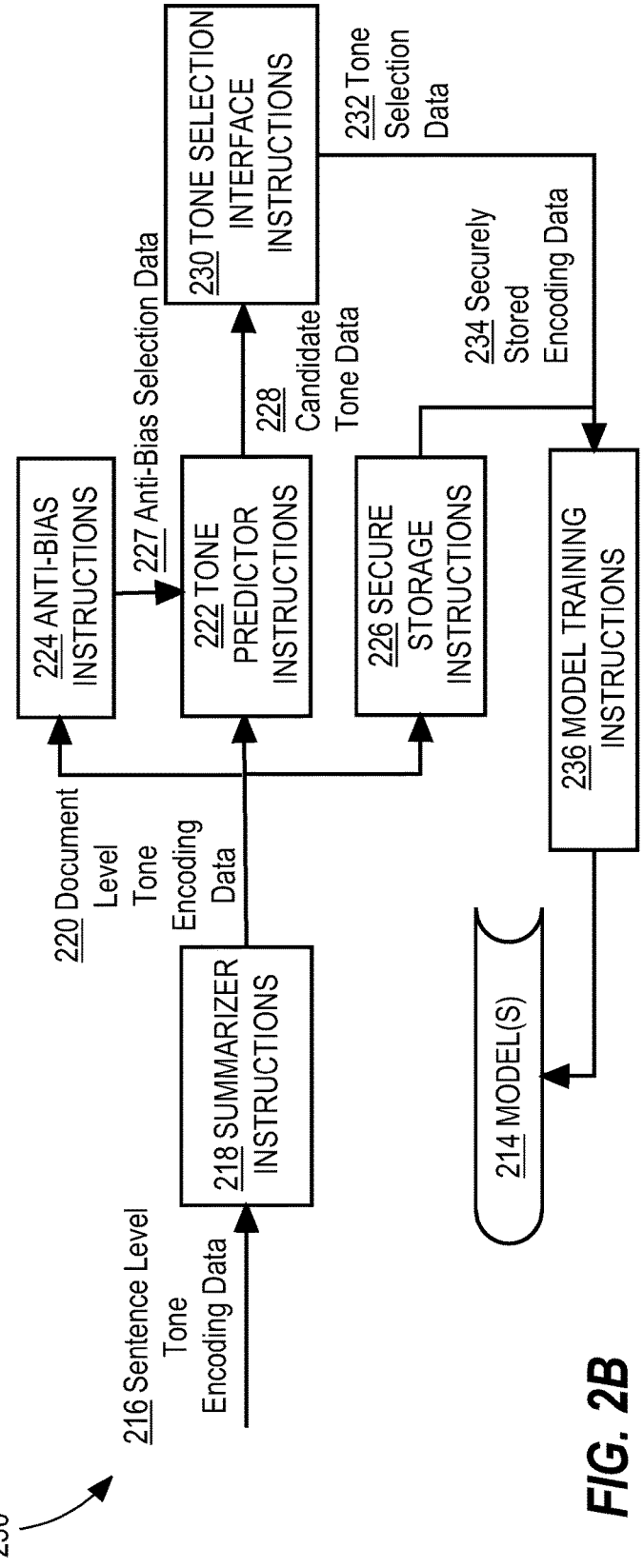
FIG. 2A
FIG. 2B

From: sender@sender.com
To: recipient@receive.com
Subject: Testing

Hello there Stash, —564

I am very happy to hear from you! This is nonsense text that will trigger the tone detection.
I'm very happy!! I'm very happy!! I'm very happy!!!

all the best, —568

Dimitris

Here's how your text sounds
Which tones did we get right?
optimistic ★★★☆☆
friendly ★★★★★
joyful ★★★★★

FIG. 5D

DETECTING THE TONE OF TEXT

BENEFIT CLAIM

This application claims the benefit under 35 U.S.C. § 120 as a continuation of application Ser. No. 17/212,957, filed Mar. 25, 2021, which claims the benefit of provisional application 63/000,315, filed Mar. 26, 2020, the entire contents of which are hereby incorporated by reference for all purposes as if fully set forth herein.

TECHNICAL FIELD

One technical field to which this disclosure relates is computer software for grammatical error correction. Another technical field to which this disclosure relates is natural language text analysis for tone detection.

BACKGROUND

The developments described in this section are approaches that could be pursued, but not necessarily approaches that have been previously conceived or pursued. Unless otherwise indicated, it should not be assumed that any of the developments described in this section qualify as prior art, or that these developments are generally known to a person of ordinary skill in the art.

Computer software applications for grammatical error correction (GEC) are configured to detect different kinds of errors in text, such as spelling, punctuation, grammatical, and word choice errors. GEC systems may highlight or annotate portions of the text that contain grammatical errors. After identifying grammatical errors in the text, GEC systems may output a grammatically correct version of the text.

SUMMARY

The appended claims may serve as a summary of the present invention.

BRIEF DESCRIPTION OF THE DRAWINGS

FIG. 2A is a flow diagram of a process that may be executed by at least one device of the computing system of FIG. 1.

FIG. 2B is a flow diagram of a process that may be executed by at least one device of the computing system of FIG. 1.

FIG. 5A, FIG. 5B, FIG. 5C, FIG. 5D, FIG. 5E, FIG. 5F, and FIG. 5G are example screen captures of displays on computer display devices that may be implemented in at least one embodiment of the computing system of FIG. 1.

Figure 1:
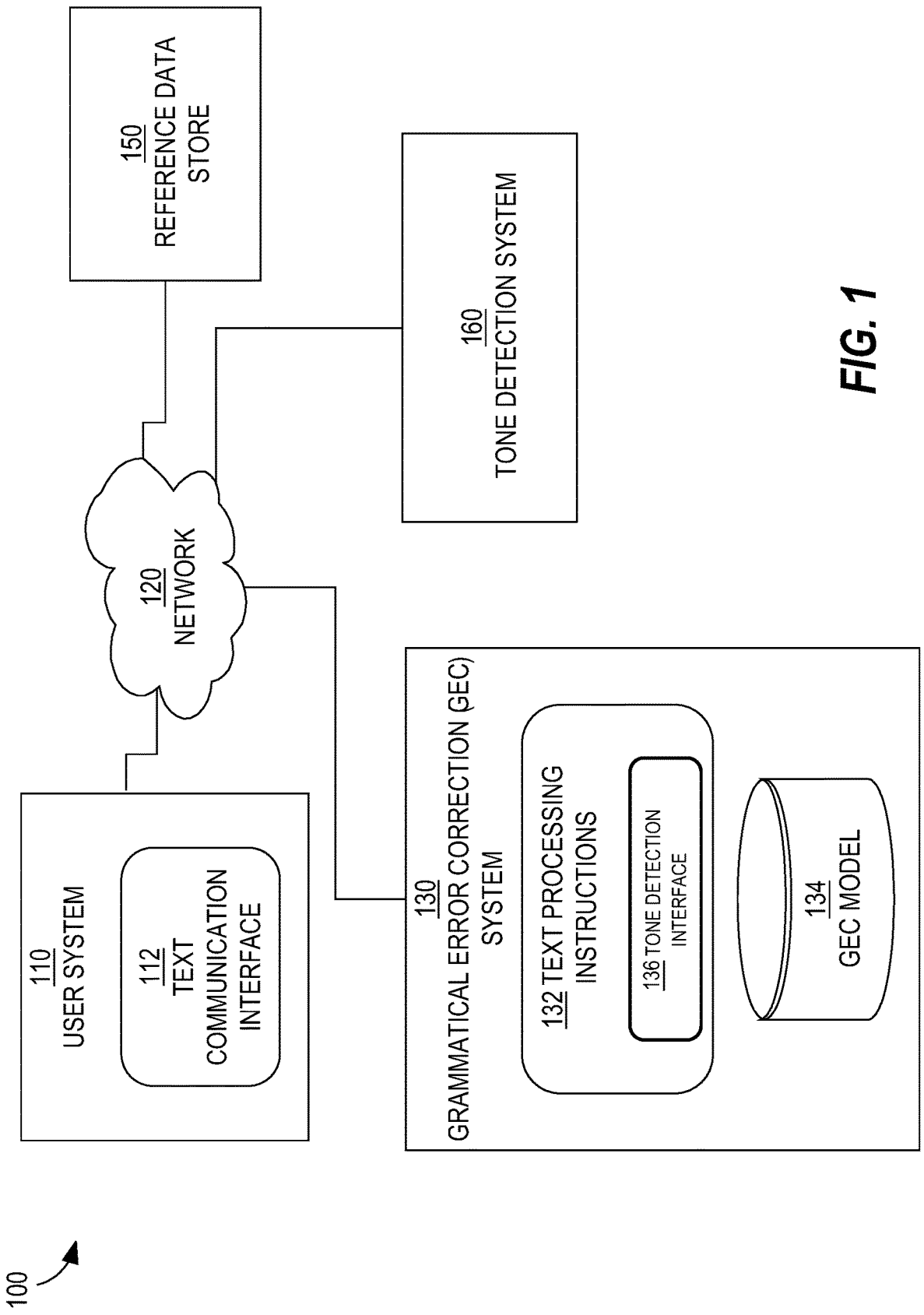
FIG. 1 is a block diagram illustrating at least one embodiment of a computing system in which aspects of the present disclosure may be implemented.

While the present invention is amenable to various modifications and alternative forms, specific embodiments are shown by way of examples in the drawings and are described in detail. However, the drawings and description are not intended to limit the invention to the forms disclosed. The intention is to cover all modifications, equivalents, and alternatives falling within the spirit and scope of the present invention as defined by the appended claims.

DETAILED DESCRIPTION

In the following description, for the purposes of explanation, numerous specific details are set forth to provide a more thorough understanding of the present invention. It will be apparent, however, that the present invention may be practiced without these specific details. In the drawings, the depiction of structures and devices may be simplified to avoid unnecessarily obscuring the present invention.

Overview

1. Technical Problem

Existing computer-implemented grammatical error correction (GEC) systems can identify grammatical errors in digital text sequences. However, errors in the tone of the digital text sequences have not been reliably detected by GEC systems. Previous approaches that have been used include simple keyword detection. For example, previous systems may determine that the tone of a sentence is negative based on the presence of the word "bad" or may determine that the sentence tone is positive based on the presence of the word "good." These approaches are relatively straightforward to implement but do not account for more subtle differences in tone.

2. Technical Challenges

The general technical problem outlined above has raised specific technical challenges for distributed computer systems, data processing, and software engineering. It has been a challenge for computers to accurately predict the tone of the text, particularly when the computer does not have access to any information except the text itself. A computer that has access to digital data representing sensory information, such as through a video feed or voice interface, or context information, such as geographic location, can use the sensory or context information to determine the tone of a text. Even then, the accuracy of the computer's tone detection depends on the proper interpretation of the sensory or context signals. If the computer does not accurately predict the tone of a text sequence, then a GEC system is unable to accurately identify and correct errors in the text, and text containing errors may pass through the system without modification, thus increasing the error rate of the system. An ancillary issue is that the GEC system does not perform as expected and its reliability is questioned, leading to decreased use of the system.

3. Technical Solutions that Address Technical Challenges

Embodiments of the disclosed technologies are structured and programmed to utilize aspects of the syntactic structure of digital text sequences to predict tone. In some embodiments, a combination of rules-based analysis and machine learning-based analysis is used and programmed to improve the accuracy of tone predictions. In some embodiments, a combination of sentence-level and document-level tone analyses are used and programmed to generate tone predictions. In some embodiments, a set of candidate tone predictions are presented to the user, and user feedback on the set of candidate tone predictions is incorporated into a machine-learned model in order to improve the future output of the machine-learned model. The improved model output results in better tone prediction, which in turn improves the accuracy and reliability of the GEC system, and reduces transmission of texts containing errors.

4. Benefits

In experiments, the disclosed technologies have been shown to present improved grammar-checking results when compared to earlier versions of tone prediction systems. In addition, the disclosed technologies improve GEC systems by enabling the GEC systems to recommend text modifications that relate to the tone of the text; when tone is correctly recognized, grammar checks are more accurate and fewer texts pass GEC checking with undetected errors.

System Overview: Grammatical Error Correction with Tone Detection

FIG. 1 illustrates a computing system in which embodiments of the features described in this document can be implemented. In the embodiment of FIG. 1, computing system 100 includes a user system 110, a grammatical error correction (GEC) system 130, a reference data store 150, and a tone detection system 160.

User system 110 includes at least one computing device, such as a personal computing device, a server, a mobile computing device, or a smart appliance. User system 110 includes at least one software application, including a text communication interface 112. Text communication interface 112 obtains or produces digital text sequences that may be analyzed by GEC system 130. Text communication interface 112 enables users and/or automatic processes to provide or digitally designate data as text sequences for analysis by GEC system 130.

In an embodiment, text communication interface 112 is any type of user interface. For example, text communication interface 112 may include a graphical user interface through which written or typed words may be received as text and/or a voice interface coupled to a microphone through which spoken words may be received via audio signals. The speech contained in the audio signals may be converted to text by, for example, a speech-to-text engine such as an automated speech recognition engine. Thus, text communication interface 112 may include at least one text data entry control element and/or at least one voice data entry control element. Data entry control elements may take the form of, for example, a text input box or a button, which can receive verbal content that is or is converted to, a text sequence that is stored in computer memory in digital form. Alternatively or in addition, text communication interface 112 may provide an application program interface (API) that allows executing programs or processes of user system 110 to make text sequences available for processing by GEC system 130 through an API call.

A digital text sequence can be produced by a computer user typing words into a text communication interface 112. For example, a user may generate a digital text sequence using a text editor, a word processor, an electronic messaging program, a command line interface, or a control element of text communication interface 112 that activates a microphone of an electronic device. The term user, as used herein, may refer to at least one human person interacting with a computing device, or may refer to an automated process that has been configured to output synthesized speech or unstructured natural language text. For instance, a bot, a personal digital assistant, or a robot may be a user, in some embodiments.

In another example, a digital text sequence is created by a computer extracting text from a digital content item, such as a document, a message, a social media posting, a list of search results, a web page, or another source of text stored in digital form. A digital text sequence can also be produced by speech-to-text software transcribing words that have been spoken by a user in the vicinity of a microphone that is operably coupled to a user system 110.

As used herein, the term text sequence may refer to an ordered sequence of at least two words. Examples of text sequences include word pairs, phrases, sentences, and documents. A sentence may include a number of word pairs and/or phrases. A document may include a number of word pairs, phrases, and/or sentences. Words, phrases, and sentences may not be mutually exclusive. For example, a sentence may contain a number of phrases, and the same word pair or phrase may be included in multiple different sentences.

The order of text in a text sequence may refer to an order of occurrence. For example, the first word of a sentence may be considered to occur earlier in the sentence than the last word of the sentence. Similarly, the last sentence of a document may be considered to occur later in the document than the first sentence of the document. Order of occurrence may also or alternatively have a temporal component whereby the order of text in a text sequence is determined by the date/time stamps. Order of occurrence may also or alternatively have a relational component. For example, threads of instant text messages may include text sequences contributed by multiple different authors, with some messages created in reply to earlier messages.

GEC system 130 is bi-directionally communicatively coupled to user system 110 and reference data store 150 by network 120, in an embodiment. GEC system 130 executes automated grammatical error correction processes on digital text sequences, including but not limited to digital text sequences received from user system 110.

A client portion of GEC system 130 may operate in user system 110, for example as a plugin or widget in a graphical user interface of a software application or as a web browser executing text communication interface 112. In an embodiment, a web browser may transmit an HTTP request over a network (e.g., the Internet) in response to user input (e.g., entering a text sequence) that is received through a user interface provided by the web application and displayed through the web browser. A server portion of GEC system 130 may receive the input, perform at least one operation to analyze the input and return at least one modified version of the input using an HTTP response that the web browser receives and processes.

In the embodiment of FIG. 1, GEC system 130 includes text processing instructions 132, GEC model 134, and tone detection interface 136.

Text processing instructions 132 are embodied as computer programming code stored in computer memory that when executed causes a computing device to operate a software-based grammatical error correction service. Text processing instructions 132 are in bidirectional digital communication with GEC model 134 and tone detection system 160 as needed to operate the software-based grammatical error correction service.

In an embodiment, text processing instructions 132 perform any needed pre-processing on text sequences received from user system 110, provide the pre-processed text sequences as input to GEC model 134, and/or pass the pre-processed text to tone detection system 160 via tone detection interface 136, receive output text sequences output by GEC model 134 and/or tone detection system 160, perform any needed post-processing on the output text sequences output by GEC model 134 and/or tone detection system 160, and provide the post-processed output text sequences to user system 110 for visual and/or audio presentation to a user, for example via text communication interface 112.

An example of pre-processing that may be performed by a computing device executing text processing instructions 132 is dividing an input text sequence into smaller portions such as words, phrases, chunks, tokens, or n-grams. An example of post-processing that may be performed by a computing device executing text processing instructions 132 is adding at least one digital markup to an output text sequence that has been produced by the GEC system 130.

Examples of digital markups include but are not limited to digital highlighting using various colors, bold, underlining, italics, bounding boxes, strikethroughs, annotations, and/or other forms of visual markup. Digital markups may also or alternatively include, in a voice interface, expressions of emphasis such as increased or decreased pitch, loudness, and/or speaking rate, which may be added to speech output produced by a text-to-speech (TTS) component of the voice interface. Digital markups may further include text modification recommendations for changing the tone of an input text sequence from, for instance, negative to neutral, negative to positive, neutral to positive, or positive to very positive. Digital markups may further include at least one interactive graphical control element that when selected enables the user to, for example, digitally accept, reject, or provide feedback on a system-generated tone prediction or a system-generated text modification recommendation.

GEC model 134 is, in an embodiment, a machine-learned model that has been trained to analyze digital input text sequences and produce digital output text sequences that are grammatically corrected. In some embodiments, GEC model 134 is a neural network-based model such as a recurrent neural network. One illustrative example of an embodiment of a neural network-based GEC model 134 is described in U.S. patent application Ser. No. 16/807,123, filed Mar. 2, 2020, published as US Pat. Pub. No. US20210271810A1, the entire contents of which are hereby incorporated by reference for all purposes as if fully set forth herein.

Reference data store 150 is, in an embodiment, at least one digital data store that stores data that may be used to train, test, and/or tune model GEC model 134 or to implement aspects of tone detection system 160. In an embodiment, reference data store 150 stores training data that is periodically collected through the use of tone detection system 160 and used to train or adapt at least one model 214 of tone detection system 160 using, for example, a reinforcement learning technique. In an embodiment, reference data store 150 stores at least one lexicon 210 and/or at least one heuristic 212 of tone detection system 160. An embodiment of tone detection system 160, including lexicon(s) 210, heuristics 212, and model(s) 214, is shown in FIG. 2 and described in more detail below.

Tone detection system 160 generates tone prediction data for a digital text sequence. In an embodiment, tone detection system 160 operates directly on a first or input text sequence. The text sequence may be received by text communication interface 112 and processed in parallel or concurrently by GEC model 134 and tone detection system 160, such that outputs of tone detection system 160 and GEC model 134 are combined to produce a final output text sequence including any text modification recommendations produced by GEC model 134 and/or tone detection system 160. In another embodiment, tone detection system 160 receives the output of GEC model 134 as input and operates on the output of GEC model 134 to produce a final output text sequence including any grammatical error corrections and/or tone modification recommendations produced by GEC model 134 and/or tone detection system 160.

In either case, the text sequence to be analyzed by tone detection system 160 may be passed to tone detection system 160 by tone detection interface 136. Tone detection interface 136 may be implemented as, for example, a function call or library call using an application programming interface (API), or as an inter-process communication interface. Thus, although not specifically shown, tone detection system 160 may be implemented within GEC system 130 rather than a separate component.

As described in more detail below, embodiments of tone detection system 160 can receive, under digital program control, electronic digital data that represents a first (or input) text sequence in a first language, where the first text sequence includes unstructured natural language text. Unstructured text as used herein may refer to text that lacks metadata or otherwise cannot readily be indexed or mapped onto database fields or objects. Unstructured text may include but is not limited to user-generated digital data, such as the body of an email message, an instant message, a document, text entered into a free-form field of an online form, an online article, a social media posting, or thread of social media postings, a comment or thread of comments on social media postings, text captions, transcriptions or subtitles of digital images, videos or movies.

Embodiments of tone detection system 160 may cause GEC system 130 to incorporate tone information into the GEC system 130's grammatical error correction processes. For example, the output of tone detection system 160 may cause GEC system 130 to modify a first text sequence to result in creating and digitally storing a second text sequence, in the same language as the first text sequence. The modification may include a grammatical error correction that is determined based on at least one tone of the first text sequence that has been predicted by the tone detection system 160.

Examples of grammatical error corrections that may be output by GEC system 130 or tone detection system 160 in response to tone predictions produced by tone detection system 160 include but are not limited to deleting text from the first text sequence based on a predicted tone, adding text to the first text sequence based on a predicted tone, modifying text of the first text sequence based on a predicted tone, reordering text of the first text sequence based on a predicted tone, adding a digital markup to the first text sequence based on a predicted tone. Additional examples of grammatical error corrections that may be output by GEC system 130 or tone detection system 160 in response to tone predictions produced by tone detection system 160 include a graphical element, such as an emoji or other graphical icon, which is indicative of a predicted tone associated with the first text sequence; or a graphical control element, such as a button, which is selectable via an input device to cause a tone-based modification of the text sequence; or a graphical control element such as a "thumbs up" or "thumbs down" indicator that is selectable to register a vote on or a rating of a predicted tone.

In an embodiment, tone detection system 160 generates a tone prediction by inputting syntactic structure data for a first text sequence into a machine-learned model, and the machine-learned model produces output that is used, alone or in combination with other tone prediction mechanisms, to compute a tone score. In an embodiment, the machine-learned model is trained using tone predictions made for text sequences analyzed during prior uses of tone detection system 160. After a ramp-up period during which a sufficient quantity of training data has been collected during the operation of tone detection system 160, the machine-learned model is brought online. Until the machine-learned model is sufficiently trained and brought online, tone detection system 160 may rely on a set of rule-based approaches to tone prediction as described in more detail below.

In any event, a particular tone score produced by tone detection system 160 is associated with a particular tone and the first text sequence. The tone score is indicative of the degree to which a particular type of tone is present or absent in at least a portion of the first text sequence. In creating and storing training data for the machine-learned model, a secure storage process may be used so that the contents of the text sequences cannot be determined, in the event of a security breach. In an embodiment, a variable length string that includes the text sequence is input into a cryptographic hash function and the output of the cryptographic hash function is combined with the corresponding tone score(s) and stored in computer memory as training data that may be used to train the machine-learned model or to adapt the machine-learned model to, for example, a particular domain.

Tone detection system 160 may be implemented using a reference set of tone labels that may be stored, for example, in reference data store 150. In some embodiments, the reference set of labels includes tone labels and emotion labels, and tone detection system 160 may initiate a different set of processing depending on whether a tone or an emotion is detected. For example, tone detection system 160 may use detected emotions to help determine the predicted tone of a text sequence or to select candidate tones to be displayed for user voting. In other embodiments, detected emotions may be processed the same way as detected tones. An example of a reference set of tone labels is shown in Table 1, below.

TABLE 1

Examples of Tone and Emotion Labels.

| Classification | Label |
| --- | --- |
| Tone/Emotion | Joyful |
| Emotion | Confident |
| Emotion | Worried |
| Emotion | Surprised |
| Emotion | Sad |
| Tone | Forceful |
| Tone | Compliant |
| Tone | Appreciative |
| Tone | Accusatory |
| Tone | Confused |
| Tone | Concerned |

For a particular first (input) text sequence, tone detection system 160 produces a tone score for each of the tone labels in a reference set of tone labels. A set of tone labels is associated with the particular text sequence. For example, tone labels having the top k tone scores, where k is a positive integer or a percentage, for instance, may be included in the set of tone labels. The tone score for a particular text sequence and a particular tone may be a probabilistic value between 0 and 1, which indicates a mathematical likelihood that the text sequence contains the particular tone. A particular tone label may have a score of zero or nearly zero with respect to a particular text sequence if tone detection system 160 predicts that the particular tone label is not present in the particular text sequence. Conversely, a particular tone label may have a score of one or nearly 1 with respect to a particular text sequence if tone detection system 160 predicts that the particular tone label is very likely present in the particular text sequence.

In some embodiments, a tone score may include both a numerical value and a sign, where the sign serves as an indication of tone intensity and the numerical value indicates a polarity of the tone. For instance, the tone score may be a negative integer if the predicted tone is negative, a positive integer if the predicted tone is positive, or zero if the predicted tone is neutral. Tone scores may be defined using a range that includes at least one negative integer and/or at least one positive integer and zero. As an example, tone detection system 160 may output tone scores in a range of integers such as between −5 and +5, where −5 indicates a very negative tone, zero indicates a neutral tone, and +5 indicates a very positive tone. The range of valid tone scores may be determined based on the requirements of a particular design or implementation of tone detection system 160 and/or GEC system 130 and is not limited to these illustrative examples.

The output of tone detection system 160 may cause GEC system 130 to modify the first text sequence to result in creating and digitally storing a second text sequence in the same language as the first text sequence. The modification may include a grammatical error correction and/or text modification recommendation that is based on at least one tone of the first text sequence that has been predicted by the tone detection system 160. Alternatively or in addition, tone detection system 160 may operate as a standalone system in some embodiments, whereby tone detection system 160 generates a second text sequence that contains only one or more tone modification recommendations without other grammatical error corrections. That is, tone detection system 160 may be used independently of or in conjunction with GEC system 130 in various embodiments.

Embodiments of tone detection system 160 compute tone scores using dependency relation data associated with word pairs or phrases of the first text sequence, where the dependency relation data is determined from machine-generated syntactic structure data of the first text sequence. To do this, in an embodiment, tone detection system 160 uses a dependency parser, which generates a digital dependency parse tree alone or in combination with part-of-speech (POS) tags. A dependency parse tree indicates, for example, various types of dependency relations between words of a text sequence and their corresponding parts of speech. In some embodiments, the dependency parser is implemented as a statistical model trained on labeled open-source data. The statistical model is used to determine the most probable dependency relations between words of the input text sequence.

Examples of dependency relations include but are not limited to subjects, objects, co-location, modifiers, and determiners. An example of a grammar that defines a set of reference dependency relations is the Universal Dependency Relations or UD v2. A grammar such as UD v2 may be stored in reference data store 150, for example, and used by tone detection system 160 to generate dependency relation data for text sequences. An example of a syntactic structure including dependency relation data for the text sequence "I'm very happy" is shown in Table 2 below.

TABLE 2

Example of Syntactic Structure Including Dependency Relation Data.
"I'm very happy"

| Position | Text | Part of Speech | Dependency Relation |
|---|---|---|---|
| (1) | I | Noun | Subject (2) |
| (2) | am | Verb | Linking (1) |
| (3) | very | Adverb | Modifies (4) |
| (4) | happy | Adjective | Predicate (1) |

Parse tree data generated by a dependency parser can be stored in computer memory in any suitable form, such as fields of a record of a database table or using nodes and edges of a graph database.

Tone detection system 160 can use dependency relation data in a variety of ways. In some embodiments, tone detection system 160 uses dependency relation data associated with a word pair or phrase of the first text sequence to adjust or even reverse the tone of the first text sequence. For example, if tone detection system 160 finds the word "good" in a sentence, and determines that the word "not" immediately precedes the word "good" in the sentence, tone detection system 160 may determine that the tone of the sentence is very negative rather than positive and may suggest a text modification, such as to replace "not good" with "not ideal," in order to reverse the tone from negative to positive or to adjust the tone from negative to neutral.

In some embodiments, tone detection system 160 uses dependency relation data to adjust a tone score. For instance, tone detection system 160 may use modifier relation data associated with word pairs or phrases of the first text sequence to increase or decrease the intensity of a tone score. In one example, if tone detection system 160 determines that the word "very" modifies the word "good," tone detection system 160 may increase the positive tone score for the first text sequence; for example, from +4 to +5. However, if tone detection system 160 determines that the word "very" modifies the word "bad," tone detection system 160 may increase the negative tone score for the first text sequence; for example, from −4 to −5.

In some embodiments, tone detection system 160 uses, alternatively or in addition to at least one machine-learned model, at least one rule-based approach that includes at least one digital lexicon to associate at least one word of the first text sequence with a tone label and/or at least one digital heuristic to associate syntactic structure data for the first text sequence with a tone label. For example, tone detection system 160 may use the machine-learned model to compute a first tone score, use a set of digital lexicons to compute a second tone score, use a set of digital heuristics to compute a third tone score, and use the first tone score, the second tone score, and the third score to predict the tone of a text sequence.

As noted above, some embodiments of tone detection system 160 initially predict tone scores using at least one digital lexicon and/or at least one digital heuristic. Once tone detection system 160 has been used a number of times sufficient to generate adequate training data for a machine-learned model, tone scores output by the machine-learned model are combined with the tone scores produced by one or more of the rule-based approaches to predict the tone of a text sequence.

In some embodiments, tone detection system 160 modifies a machine-learned model used to make tone predictions in response to tone selection data received via a graphical control element; for example, vote data received via a vote button displayed in a portion of text communication interface 112. In an embodiment, tone detection system 160 causes outputting to a display, such as text communication interface 112, of a set of graphical elements, where a graphical element of the set of graphical elements is indicative of a candidate tone of a set of candidate tones. For instance, text communication interface 112 may display a list of candidate tones and associated graphical elements. In response to receiving tone selection data corresponding to at least one candidate tone of the set of candidate tones, the received tone selection data is used to modify the machine-learned model.

In some embodiments, tone detection system 160 uses an anti-bias mechanism to determine at least one of the candidate tones that is displayed. An example of an anti-bias mechanism is an algorithmic process that periodically selects a candidate tone that is considered less dominant because it is not one of the tones that has a tone score in the top k tone scores. Digital feedback received regarding the less dominant tone is used to modify the machine-learned model.

Each of the user system 110, GEC system 130, reference data store 150, and tone detection system 160 is implemented using at least one computing device that is communicatively coupled to electronic communications network 120. User system 110 is configured to communicate bidirectionally with at least GEC system 130, for example over network 120. GEC system 130 is configured to communicate bidirectionally with at least user system 110, reference data store 150, and tone detection system 160, for example over network 120. In an embodiment, GEC system 130 communicates bidirectionally with tone detection system 160 via tone detection interface 136. Examples of communicative coupling mechanisms include inter-process communication (IPC) interfaces and application program interfaces (APIs). In other embodiments, tone detection system 160 is part of GEC system 130.

The features of user system 110, GEC system 130, reference data store 150, and tone detection system 160 are implemented using computer software, hardware, or software and hardware, and may include combinations of automated functionality, data structures, and digital data, which are represented schematically in FIG. 1. User system 110, GEC system 130, reference data store 150, and tone detection system 160 are shown as separate elements in FIG. 1 for ease of discussion but the illustration is not meant to imply that separation of these elements is required. The illustrated systems and data stores (or their functionality) may be divided over any number of physical systems, including a single physical computer system, and can communicate with each other in any appropriate manner.

GEC model 134 and reference data store 150 may each reside on at least one persistent and/or volatile storage device that may reside within the same local network as at least one other device of computing system 100 and/or in a network that is remote relative to at least one other device of computing system 100. Thus, although depicted as being included in computing system 100, GEC model 134 and/or reference data store 150 may be part of computing system 100 or accessed by computing system 100 over a network, such as a network 120.

Logical connection as used in this disclosure may refer to a flow of digital information or data communication that is established between two devices on a network by network software communicating with, for example, the devices' operating systems either directly or by a virtual machine.

Examples of protocols that may be used to establish a logical connection include hypertext transfer protocol (HTTP) and secure sockets layer (SSL).

Network 120 may be implemented on any medium or mechanism that provides for the exchange of data, signals, and/or instructions between components 110, 130, 150 of system 100. Examples of network 120 include, without limitation, a Local Area Network (LAN), a Wide Area Network (WAN), an Ethernet network or the Internet, or at least one terrestrial, satellite or wireless link, or a combination of any number of different networks and/or communication links.

Example Sentence-Level Tone Detection System

FIG. 2A is a simplified flow diagram of an embodiment of operations that can be performed by at least one device of a computing system. The operations of a flow 200 as shown in FIG. 2A can be implemented using processor-executable instructions that are stored in computer memory. For purposes of providing a clear example, the operations of FIG. 2A are described as performed by computing system 100, but other embodiments may use other systems, devices, or implemented techniques.

Flow 200 involves the execution, by at least one processor, of computer code including syntactic parser instructions 204 and sentence-level tone encoder instructions 208. Instructions 204, 208 operate on digital data including portions of document text 202, using one or more digital lexicons 210 and/or one or more digital heuristics 212 and/or one or more digital models 214. Instructions 204, 208 as well as portions of digital lexicons 210, digital heuristics 212, and/or digital models 214 are written using any suitable computer programming language, such as Python, and/or software development framework. Digital data, including portions of document text 202, digital lexicons 210, digital heuristics 212, and digital models 214 are stored in, for example, a searchable database and/or a structured data file such as an XML (Extensible Markup Language) file. In an embodiment, portions of document text 202, digital lexicons 210, digital heuristics 212, and digital models 214 may be stored in reference data store 150.

Syntactic parser instructions 204 when executed by one or more processors receive and process document text 202. Document text 202 includes at least one text sequence. In some embodiments, document text 202 is received via a graphical user interface, such as a text editor or a front-end of a message authoring application.

During the processing of document text 202, syntactic parser instructions 204 detects at least one end-of-sentence signal in document text 202. Examples of end of sentence signals include but are not limited to periods and other punctuation marks, blank spaces; tab signals, and new paragraph signals that are followed by additional text. Syntactic parser instructions 204 uses an end-of-sentence signal to identify a first portion of a text sequence of document text 202 that precedes the end-of-sentence signal.

Syntactic parser instructions 204 extracts a set of features from the first portion of the text sequence preceding the end of sentence signal. Examples of features of the text sequence include raw features such as n-grams, tokens, words, word pairs, phrases, and chunks of the text sequence. Syntactic parser instructions 204 analyzes the raw features using, for example, a statistical model, and produces computed features, such as part-of-speech tags and dependency relation data, associated with the raw features. For example, computed features may include dependency relation data associated with particular word pairs or phrases of the first portion of the text sequence. Computed features may also include part of speech data such as annotations that identify the part of speech of a particular word of the text sequence. Computed features may be associated with raw features by, for example, annotating portions of the raw features with the corresponding computed features. As used herein, raw features and computed features may be referred to collectively as features.

Syntactic parser instructions 204 produces and outputs sentence-level syntactic structure data 206. Sentence-level syntactic structure data 206 includes the raw features of the first portion of the text sequence and its associated computed features. Syntactic parser instructions 204 repeat the foregoing parsing operations for other portions of document text 202 until syntactic parser instructions 204 detect an end-of-document signal. Examples of end of document signals include but are not limited to periods and other punctuation marks, blank spaces; tab signals, and new paragraph signals that are not followed by additional text.

Sentence-level syntactic structure data 206 is passed or otherwise provided as input to sentence-level tone-encoder instructions 208. Sentence-level tone encoder instructions 208 when executed by one or more processors receive and process sentence-level syntactic structure data 206. In an embodiment, sentence-level syntactic structure data 206 applies, to sentence-level syntactic structure data 206, at least one machine-stored rule and a first machine-learned model. Using the at least one machine-stored rule and the first machine-learned model, sentence-level tone encoder instructions 208 compute a set of sentence-level tone scores for the first portion of the text sequence that precedes the end of sentence signal. In an embodiment, a sentence-level tone score is indicative of a presence or absence of a particular tone in the first portion of the text sequence.

In an embodiment, the machine-stored rules used by sentence-level tone encoder instructions 208 are implemented using lexicons 210 and heuristics 212 while the first machine-learned model is implemented using a model 214. An example of a lexicon 210 is a searchable database or table that stores mappings between raw text features, such as words, and corresponding tones. An example of a mapping of a raw text feature to a tone is "great: joyful," where "great" is the raw text feature (a word), "joyful" is the tone, and ":" indicates the mapping.

Another example of a lexicon 210 is a searchable database or table the stores mappings of raw text features, such as words, word pairs or phrases, with indications of tone intensity. An example of a mapping of a raw text feature to a tone intensity is "good: optimistic: +2," or "great: optimistic: +4," where the tone intensity is indicated by a numerical value. That is, both "good" and "great" map to the tone, "optimistic," but the tone intensity is higher for "great."

In an embodiment, sentence-level tone encoder instructions 208 uses both a tone lexicon and a tone intensity lexicon. During the processing of a text sequence, when sentence-level tone encoder instructions 208 detects a word that is in a lexicon 210, sentence-level tone encoder instructions 208 annotates the text sequence with the tone and/or tone intensity indicated by the lexicon 210.

An example of a heuristic 212 is a machine-implemented rule that when executed by a processor determines when or whether a particular tone or a particular tone intensity is associated with a particular portion of a text sequence. In an embodiment, heuristics 212 are configured to detect certain combinations of tones and tone intensities based on aspects of the syntactic structure of a text sequence. An example of a heuristic 212 is "the presence of the word 'very' in a text sequence modifies the intensity of a detected tone or emotion." Another example of a heuristic 212 is "the presence of the word 'not' in a text sequence reverses the sentiment (or polarity) of the text sequence." Yet another example of a heuristic 212 is "a particular tone (such as 'appreciation') is not associated with a text sequence unless the text sequence has a particular syntactic structure." A heuristic 212 can specify a word-level rule and/or a phrase-level rule. A heuristic 212 can be made up of a set of rules or a single rule.

An example of model 214 is a sentence-level tone prediction model that has been trained using a corpus of text sequences that have been annotated with tone and/or tone intensity labels. The model 214 can be trained with samples of text sequences obtained from a publicly available data source that have been hand-labeled with tone and/or tone intensity annotations. Alternatively or in addition, model 214 can be trained or adapted using a reinforcement learning approach as described herein.

In an embodiment, model 214 is a machine-learned statistical model such as a logistic regression model. That is, a logistic regression algorithm is applied to the training data to create model 214. In one version, model 214 is a binary classifier created using an open-source machine learning library such as a Vowpal Wabbit framework. In one particular, version, model 214 has a configuration that includes the following settings: individual learning rate, feature-normalized updates, safe/importance-aware updates, a logistic loss function, a generalized logistic function, max order of n-grams set to a positive integer less than 10 or less than 5, and max order of skip-grams set to a positive integer less than ten or less than five and greater than the max order of n-grams value. The foregoing is provided as an illustrative, non-limiting example. It will be understood that the parameter configuration of model 214 may be adapted to the requirements of a particular design or implementation of the system.

In an embodiment of a reinforcement learning approach, a set of candidate tones is presented to a user via a graphical user interface, and the user rates or votes on one or more of the candidate tones through the graphical user interface. The user's ratings or votes received via the graphical user interface are combined with the text sequence and/or the syntactic structure of the text sequence, using, for example, a concatenation function. The combination of user feedback data and the text sequence and/or the syntactic structure data is used as training data for model 214. The foregoing examples of training data are provided for illustration purposes only and other forms and sources of training data may be used in other embodiments.

Sentence-level tone encoder instructions 208 outputs sentence-level tone encoding data 216. In an embodiment, sentence-level tone encoding data 216 includes the tone scores and/or tone intensity scores produced using one or more of lexicons 210, heuristics 212, and models 214. For example, sentence-level tone encoding data 216 may include a text sequence of document text 202, syntactic structure data for the text sequence, and the associated tone annotations or tone scores produced by each of lexicons 210, heuristics 212, and models 214.

In an embodiment, sentence-level tone encoder instructions 208 uses a machine-learned model 214 to compute a first sentence-level score, uses a set of digital lexicons to compute at least one second sentence-level score, and uses a set of digital heuristics to compute at least one third sentence-level score, and uses a combination of the first sentence-level score, the second sentence-level score, and the third sentence-level score as sentence-level tone encoding data 216.

Sentence-level tone encoding data 216 may further include weight values assigned by sentence-level tone encoder instructions 208 to the tone scores produced by lexicons 210, heuristics 212 and models 214. For instance, output of model 214 can be used to increase or decrease weight values associated with output of lexicons 210 and/or heuristics 212, where the weight values serve as numerical indicators of the relative significance of a particular tone score with respect to a particular text sequence. As such, tone predictions produced by a model 214, which makes tone predictions based on historic instances of training data, may override tone scores produced by one or more of the rule-based approaches. For example, a model 214 may discard a tone prediction produced by a lexicon 210 or heuristic 212 based on its analysis of the input text sequence. In this way, sentence-level tone encoder instructions 208 can account for the possibility that a text sequence may have multiple different semantic interpretations and use a model 214 to select the most probable semantic interpretation and associated tone prediction, given the training data used to create the model 214.

For ease of discussion, terminology such as tone score, tone annotation or tone label may be used herein to refer to digital data that provides an indication of a particular tone, a particular tone intensity, or a particular tone polarity or sentiment, or a combination of any of the foregoing. Thus, for example, a tone score may indicate the presence or absence of a tone as well as its polarity and intensity.

Figure 5A:
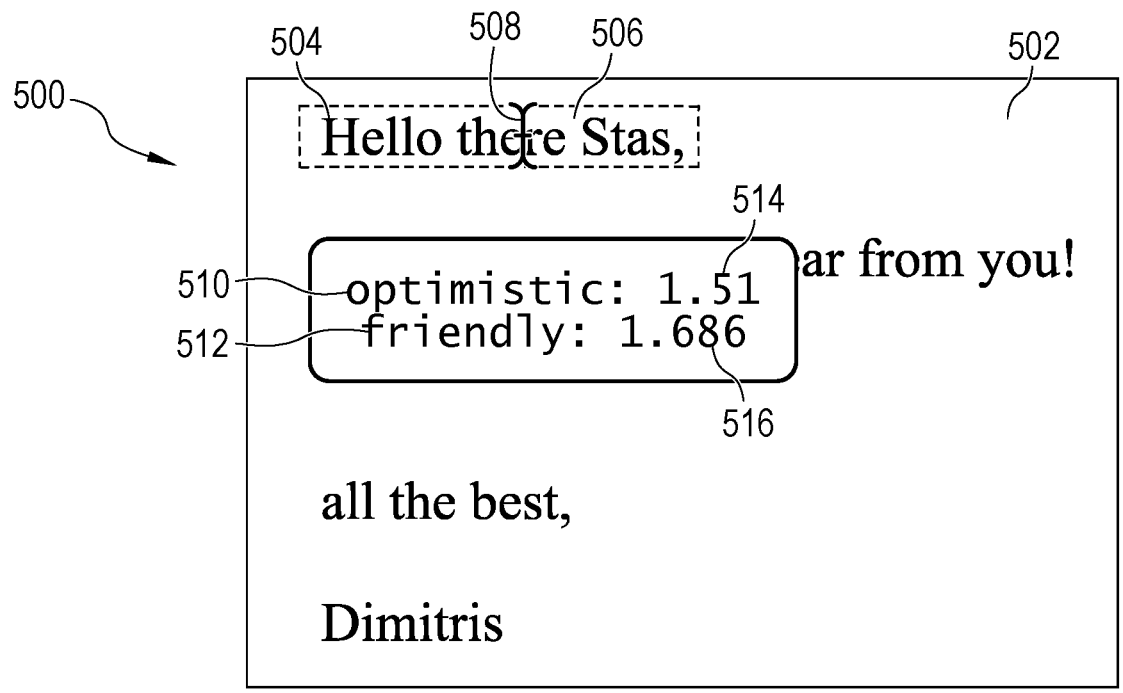
Figure 5B:
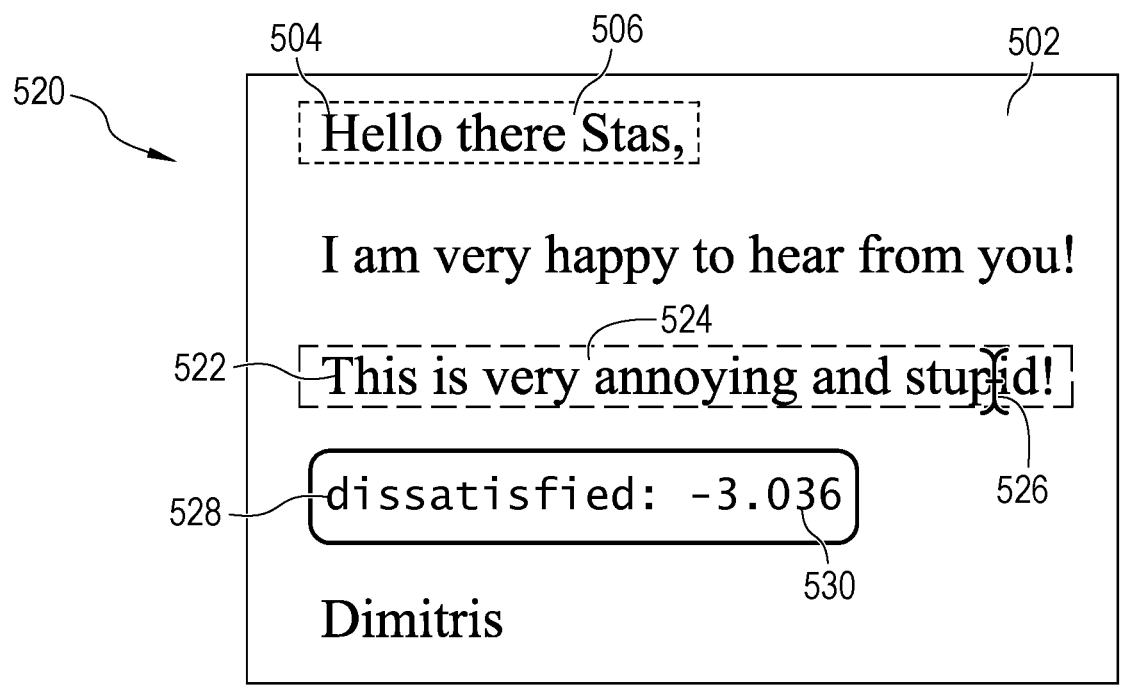

Sentence-level tone encoder instructions 208 repeats the foregoing sentence-level tone scoring operations on sentence-level syntactic structure data 206 corresponding to other portions of document text 202. In an embodiment, sentence-level tone encoding data 216 may be output for display to a user and/or provided as input to a document-level tone detection process such as flow 250 shown in FIG. 2B, described below. Examples of sentence-level tone encoding data 216, including tone scores and tone labels, are shown in FIG. 5A and FIG. 5B, described below.

Example Document-Level Tone Detection System

FIG. 2B is a simplified flow diagram of an embodiment of operations that can be performed by at least one device of a computing system. The operations of flow 250 as shown in FIG. 2B can be implemented using processor-executable instructions that are stored in computer memory. For purposes of providing a clear example, the operations of FIG. 2B are described as performed by computing system 100, but other embodiments may use other systems, devices, or implemented techniques.

Flow 250 involves the execution, by at least one processor, of computer code including summarizer instructions 218, tone predictor instructions 222, anti-bias instructions 224, secure storage instructions 226, tone selection interface instructions 230, and model training instructions 236. Instructions 218, 222, 224, 226, 230, 236 operate on digital data including portions of sentence-level tone encoding data 216. Instructions 218, 222, 224, 226, 230, 236 are written using any suitable computer programming language and/or software development framework. Digital data, including portions of sentence-level encoding data 216, document-level encoding data 220, anti-bias selection data 227, candidate tone data 228, tone selection data 232 and securely stored encoding data 234 are stored in computer memory as needed, for example, in a searchable database and/or a structured data file such as an XML (Extensible Markup Language) file. In an embodiment, portions of sentence-level encoding data 216, document-level encoding data 220, anti-bias selection data 227, candidate tone data 228, tone selection data 232 and securely stored encoding data 234 are stored in reference data store 150.

In an embodiment, summarizer instructions 218 when executed by one or more processors takes as input sentence-level tone encoding data 216 that has been produced by sentence-level tone encoder instructions 208 for a number of different text sequences of document text 202. Summarizer instructions 218 synthesizes the sentence-level tone encoding data 216 to produce document-level encoding data 220. For example, summarizer instructions 218 may concatenate all of the sentence-level tone encoding data 216 for a particular document text 202 to create document-level tone encoding data 220. Alternatively or in addition, summarizer instructions 218 may compute a sum of tone scores for each tone indicated in the sentence-level tone encoding data 216 for a particular document text 202 and include the summed tone scores in document-level tone encoding data 220.

Figure 5C:
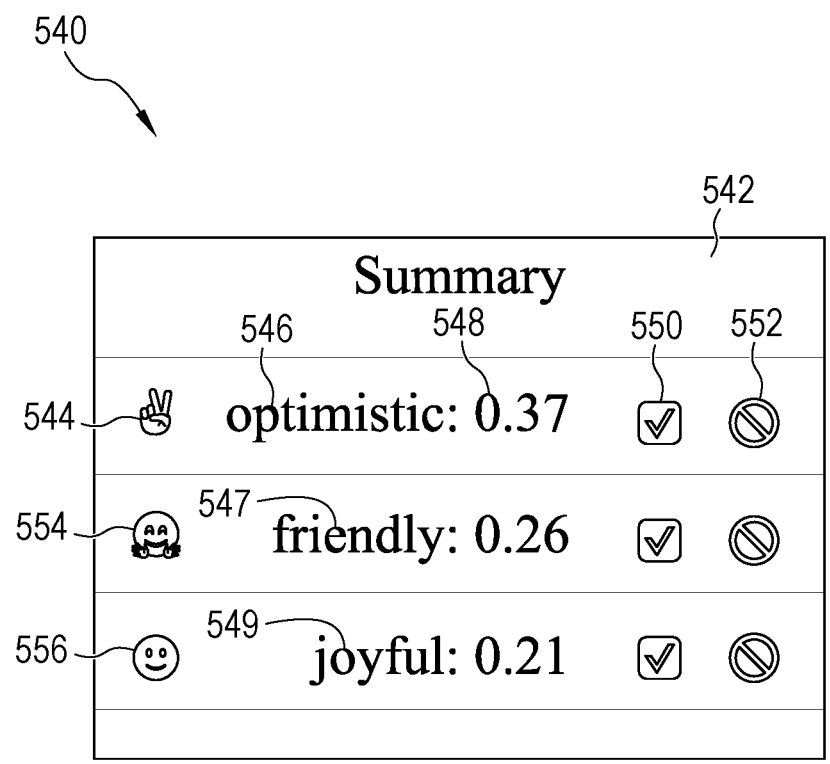

Document-level tone encoding data 220 is input to tone predictor instructions 222, anti-bias instructions 224, and secure storage instructions 226. Tone predictor instructions 222 when executed by one or more processors select a set of document-level tone scores and corresponding tone labels based on document-level tone encoding data 220. For example, tone predictor instructions 222 may select the top k tone scores, where k is a threshold integer or percentage value, and include the tone labels corresponding to those top k tone scores in candidate tone data 228. Examples of document-level tone encoding data 220, including tone labels and tone scores, are shown in FIG. 5C, described below.

A long text sequence may have different tones in different parts of the text sequence. While multiple different sentence-level tone annotations may be made throughout the text sequence is, only a selected subset of predicted tones are output and/or shown in the user interface for a user rating or vote. If a particular tone is repeatedly shown in the selected subset of tones, this biases the data because the user feedback is likely to be consistently positive.

To avoid biasing the model based on repeated selection of the most common tone, a low-scoring tone may be randomly selected and included in the set of candidate tones. This implements "exploration versus exploitation" and has been found to improve the accuracy of tone recommendations by allowing users to select a tone that is correct, but atypical. User feedback selecting a low-scoring tone is considered more accurate than the repeated selection of high-scoring tones.

To that end, anti-bias instructions 224 when executed by one or more processors can be used to periodically modify the set of document-level tone scores that have been selected by tone predictor instructions 222. For instance, if a particular tone or emotion consistently scores high and tends to dominate the tone predictions, anti-bias instructions 224 can supply anti-bias selection data 227 which is used to incorporate one or more non-dominant tones into the candidate tone data 228. Examples of anti-bias selection data include randomly selected document-level tone scores that fall below a threshold tone score value or probability value, such as tone scores that are in the bottom k tone scores or are at least less than the lowest tone score in the top k tone scores or have a probability less than a probability threshold value.

In an embodiment, anti-bias instructions 224 are implemented using a second machine-learned model, such as a contextual multi-armed bandit model. In a particular embodiment, anti-bias instructions 224 are implemented as a multi-armed bandit model using an open-source machine-learning framework such as Vowpal Wabbit. The foregoing is provided as an illustrative, non-limiting example and it will be understood that the configuration of anti-bias instructions 224 may be adapted to the requirements of a particular design or implementation of the system.

Tone predictor instructions 222 outputs candidate tone data 228 for processing by tone selection interface instructions 230. Candidate tone data 228 includes a set of candidate tone labels that may be associated with document text 202. As a result of anti-bias instructions 224, candidate tone instructions 222 may periodically include, in candidate tone data 222, a tone label that is less mathematically likely to be associated with document text 202.

Text sequences and/or corresponding syntactic structure data, which give rise to candidate tone data 228, can be stored persistently for the period of time needed to receive user feedback on candidate tone data 228. To protect the text sequences from unauthorized access, secure storage instructions 226 when executed by one or more processors creates a secure version of portions of the text sequence and/or syntactic structure data. To do this, in an embodiment, secure storage instructions 226 generates a one-way hash value of each discrete portion of the text sequence using a cryptographic hash function. For example, secure storage instructions 226 may hash each word, token, n-gram, or phrase separately. In this way, secure storage instructions 226 enable the system to avoid unauthorized disclosure of the text sequence if a security breach occurs.

Figures 5E, 5F:
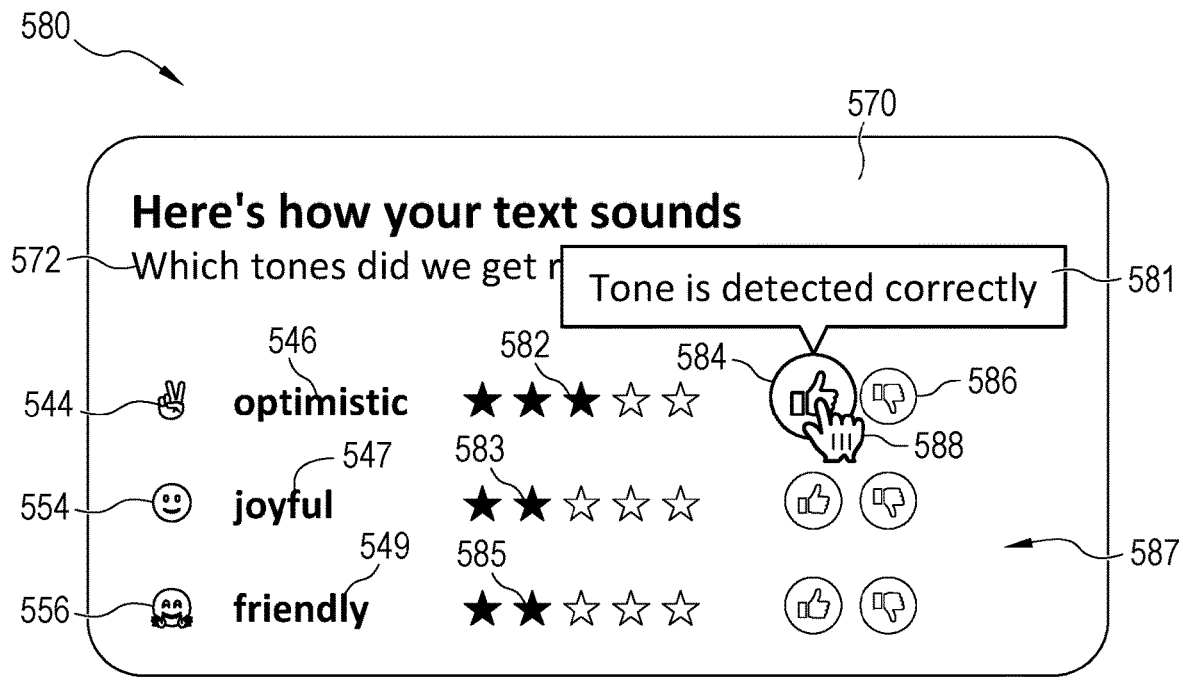

Tone selection interface instructions 230 when executed by a processor convert candidate tone data 228 to a display of tone labels. In an embodiment, tone selection interface instructions 230 causes displaying, on a graphical user interface such as text communication interface 112, a set of tone labels corresponding to candidate tone data 228. In an embodiment, tone selection interface instructions 230 also causes displaying, on the graphical user interface, at least one graphical control element that is selectable by a user to provide a rating or vote for one or more of the tone labels. Examples of graphical user interface elements and displays that may be produced as a result of the execution of tone selection interface instructions 230 are shown in FIG. 5D, FIG. 5E, and FIG. 5F, described below.

In response to the display of tone labels and graphical control elements for user rating or voting, tone selection interface instructions 230 outputs tone selection data 232. Tone selection data 232 corresponds to user input indicative of ratings or votes received via the graphical control elements of the display of tone labels, which has been generated by tone selection interface instructions 230.

Model training instructions 236 when executed by one or more processors combine tone selection data 232 with the corresponding securely stored encoding data 234 to produce instances of training data and feed the instances of training data as input to a model 214. To produce the instances of training data, tone selection data 232 is mapped to the corresponding portion(s) of securely stored encoding data 234. This is possible because securely stored encoding data 234 contains hash values for individual portions of the input text sequence.

Tone selection data 232 can be linked with the particular portion(s) of the input text sequence that gave rise to the tone prediction on which user feedback was received. For example, if tone detection system 160 predicts that a tone of a text sequence is "optimistic" but the user feedback is "thumbs down," model training instructions 236 maps the "thumbs down" tone selection data 232 to all portions of the text sequence that contributed to the "optimistic" prediction. In this way, a model 214 can be modified or adapted over time in response to user feedback.

In an embodiment, candidate tone data 228 and/or tone selection data 232 is used to create and digitally store a modification recommendation for the input text sequence. Examples of modification recommendations include but are not limited to deleting text from the text sequence; adding text to the text sequence; modifying text of the text sequence; reordering text of the text sequence; adding a digital markup to the first portion of the text sequence, and adding a graphical control element indicative of a tone of the first portion of the text sequence. In some embodiments, text modification recommendations and/or sentence-level tone encoding data 216 and/or document-level encoding data 220 and/or candidate tone data 228 and/or tone selection data 232 are provided to GEC system 130, for example via tone detection interface 136.

Example Sentence-Level Tone Detection Process

Figure 3:
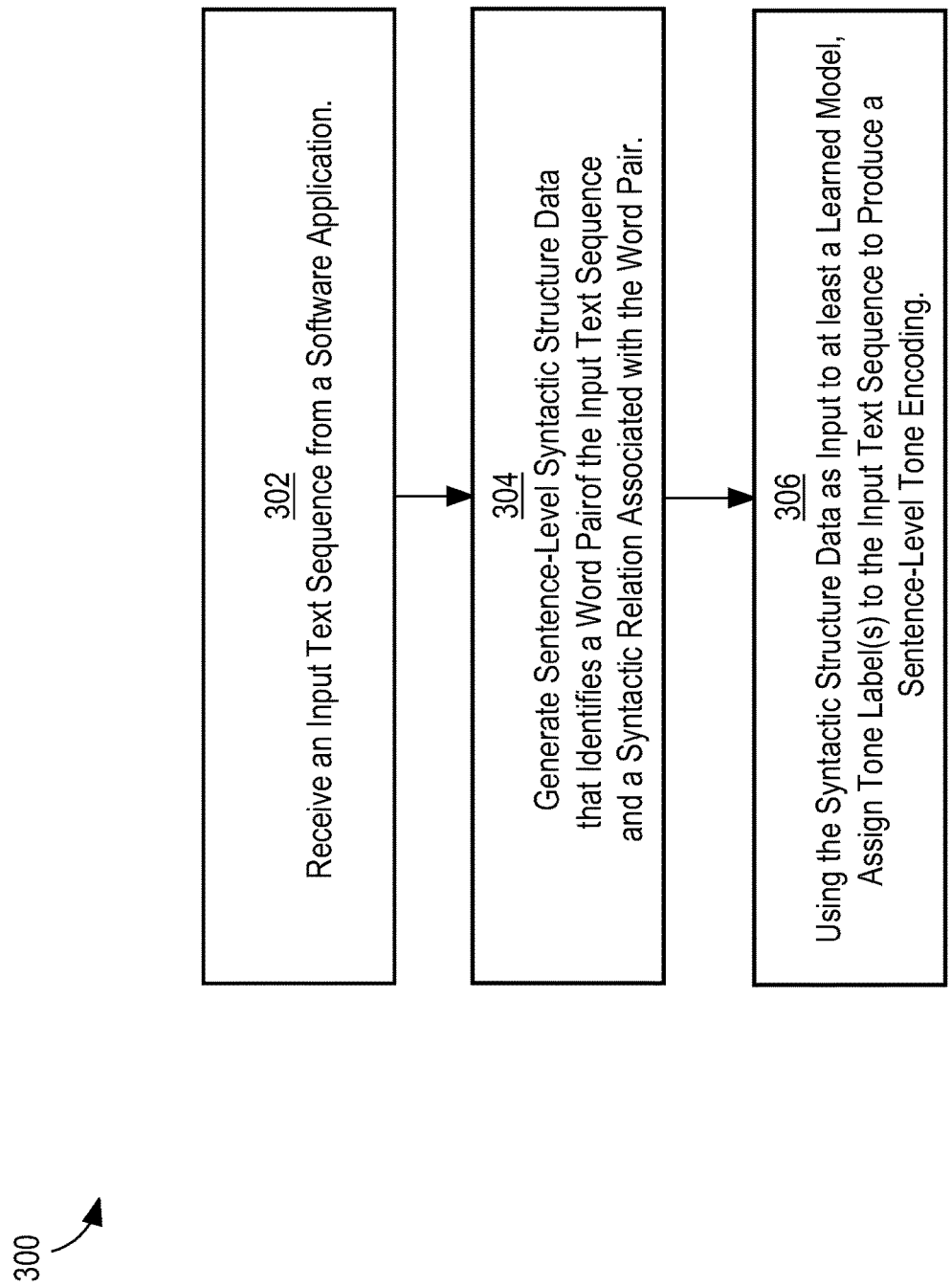
FIG. 3 is a flow diagram of a process that may be executed by at least one device of the computing system of FIG. 1.

FIG. 3 is a simplified flow diagram of an embodiment of operations that can be performed by at least one device of a computing system. The operations of a flow 300 as shown in FIG. 3 can be implemented using processor-executable instructions that are stored in computer memory. For purposes of providing a clear example, the operations of FIG. 3 are described as performed by computing system 100, but other embodiments may use other systems or implemented techniques. In an embodiment, the operations of flow 300 are performed by tone detection system 160.

Operation 302 when executed by at least one processor causes an input text sequence, such as a sentence or a document, to be received from a software application. An example of a software application is a content authoring tool running on user system 110. The input text sequence can be received by text processing instructions 132 by, for example, text communication interface 112. Alternatively or in addition, the input text sequence can be received by tone detection system 160 via tone detection interface 136.

Operation 304 when executed by at least one processor generates sentence-level syntactic structure data that identifies at least a word pair of the input text sequence received by operation 302 and a syntactic relation associated with the word pair. In an embodiment, operation 304 may be performed by syntactic parser instructions 204, described above.

Operation 306 when executed by at least one processor uses the syntactic structure data produced by operation 304 as input to at least a learned model, and uses output produced by at least the learned model to assign one or more tone labels to the input text sequence and thereby produce sentence-level tone encoding data. For example, operation 306 may be performed by sentence-level tone encoder instructions 208, described above.

After executing operation 306, flow 300 may pass the sentence-level tone encoding data produced by operation 306 to another system, program, or process, such as flow 400, described below. Flow 300 ends or returns to operation 306 to receive and process another input text sequence.

Example Document-Level Tone Detection Process

Figure 4:
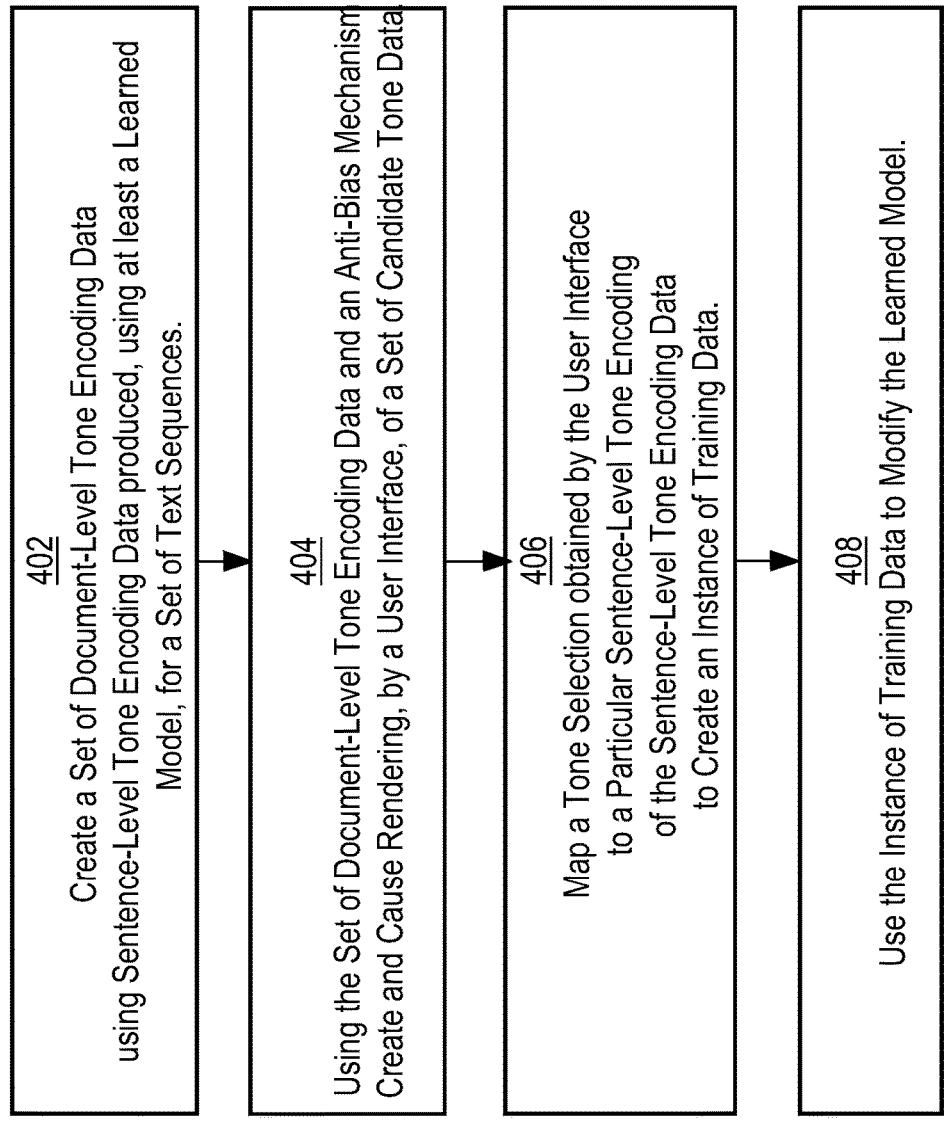
FIG. 4 is a flow diagram of a process that may be executed by at least one device of the computing system of FIG. 1.

FIG. 4 is a simplified flow diagram of an embodiment of operations that can be performed by at least one device of a computing system. The operations of a flow 400 as shown in FIG. 4 can be implemented using processor-executable instructions that are stored in computer memory. For purposes of providing a clear example, the operations of FIG. 4 are described as performed by computing system 100, but other embodiments may use other systems or implemented techniques. In an embodiment, the operations of flow 400 are performed by tone detection system 160, described above.

Operation 402 when executed by at least one processor creates a set of document-level tone encoding data using sentence-level tone encoding data produced, using at least a learned model, for a set of text sequences. In an embodiment, the sentence-level tone encoding data used by operation 402 includes sentence-level tone encoding data output by flow 300, described above. In an embodiment, operation 402 may be performed by summarizer instructions 218, described above.

Operation 404 uses the set of document-level tone encoding data produced by operation 402 and an anti-bias mechanism to create and cause rendering, by a user interface, of a set of candidate tone data. In an embodiment, portions of operation 404 may be performed by tone predictor instructions 222, anti-bias instructions 224, and tone selection interface instructions 230, described above.

Operation 406 maps a tone selection obtained by the user interface rendered as a result of operation 404 to a particular sentence-level tone encoding of the sentence-level tone encoding data produced by operation 402 to create and output an instance of training data. Operation 408 uses the instance of training data output by operation 406 to modify the learned model that produced the sentence-level tone encoding data used in operation 402. In an embodiment, portions of operation 406 and operation 408 may be performed by model training instructions 236, described above.

Example Sentence-Level Tone Detection Display

FIG. 5A and FIG. 5B are screen captures of examples of displays that may be implemented in an embodiment of the computing system of FIG. 1. In particular, FIG. 5A and FIG. 5B illustrate examples of sentence-level tone predictions that may be generated using the disclosed technologies. In FIG. 5A, a user of a software application has typed four lines of text into a text input window 500, with blank lines in between each line of text. The disclosed technologies may identify the entire text contents of text input window 500, beginning with "Hello" and ending with "Dimitris," as a text sequence or document 502. The disclosed technologies may treat each line of text sequence 502 as a portion of text sequence 502. For example, the disclosed technologies may identify the first line of text, "Hello there Stas," as a first portion 504 of text sequence 502.

The sentence-level tone predictions shown in FIG. 5A may be produced as a result of processor execution of flow 200 on first portion 504. In FIG. 5A, the first portion 504 is displayed with highlighting 506 because the first portion 504 has been analyzed by an embodiment of tone detection system 160. Examples of highlighting 506 include but are not limited to adding a background color, changing the color of the text, and adding bold, italics, or underlining to the text. When cursor 508 is positioned over any part of first portion 504, a sub-window overlays text input window 500 and displays sentence-level tone labels 510, 512 and corresponding sentence-level tone scores 514, 516. Sentence-level tone labels 510, 512 and sentence-level tone scores 514, 516 have been determined and displayed as a result of an embodiment of tone detection system 160 analyzing first portion 504 including any syntactic structure data associated with first portion 504. As can be seen from FIG. 5A, any portion of a text sequence can give rise to multiple tone labels. All or only a subset of the tone labels and/or tone scores determined by tone detection system 160 may be displayed. In some embodiments, sentence-level labels and/or sentence-level tone scores are computed but not displayed to the user.

FIG. 5B shows text window 520, which is a modified version of text input window 500 and contains the same text sequence 502 as text input window 500, except that now a sentence-level tone label 528 and corresponding sentence-level tone score 530 are displayed for a third portion 522 of text sequence 502. Sentence-level tone label 528 and sentence-level tone score 530 have been generated as a result of third portion 522 being analyzed by an embodiment of tone detection system 160. For example, the sentence-level tone predictions shown in FIG. 5B may be produced as a result of processor execution of flow 200 on third portion 522.

In FIG. 5B, highlighting 524 is applied to the third portion 522. Sentence-level tone label 528 and corresponding sentence-level tone score 530 are displayed in response to cursor 526 being positioned over the third portion 522. Sentence-level tone score 530 includes a negative sign, which indicates that it has a different sentiment or polarity than sentence-level tone scores 514, 516. As such, highlighting 524 may be different from highlighting 506. For example, highlighting 506 may include a yellow or green color while highlighting 524 may include a red color.

Example Document-Level Tone Detection Displays

FIG. 5C is a screen capture of an example of a display that may be implemented in an embodiment of the computing system of FIG. 1. In particular, FIG. 5C illustrates an example of document-level tone predictions that may be generated using the disclosed technologies. For example, the document-level tone predictions shown in FIG. 5C may be produced as a result of processor execution of flow 250.

In FIG. 5C, a window 540 includes a summary display 542. Summary display 542 includes document-level tone detection labels and document-level tone scores for an entire text sequence or document. For instance, summary display 542 may display the results produced by an embodiment of tone detection system 160 using as input the entire text sequence 502 or at least a combination of first portion 504 and third portion 522.

Summary display 542 includes, for each tone included in the summary, document-level graphical tone indicators 544, 554, 556 and document-level tone labels 546, 547, 549. A document-level tone score, such as tone score 548, is displayed for each corresponding document-level tone label 546, 547, 549. Summary display 542 also includes yes/no vote buttons 550, 552 for each document-level tone label 546, 547, 549. Each graphical tone indicator and tone label pair identifies a different tone; however, the corresponding tone scores may be the same or different for different tone labels.

Vote buttons 550, 552 are interactive in a toggle fashion such that buttons 550, 552 cannot be simultaneously selected for a particular tone label. However, different vote buttons 550, 552 may be selected for different tone labels. For instance, a button 550 may be selected for label 546 but not for label 547, and a button 552 may be displayed for label 549 but not for label 546 or 547. Additionally, a user may choose not to select any of buttons 550, 552 and this inaction may be recorded by the system as user feedback and used for reinforcement learning purposes.

FIG. 5D, FIG. 5E, and FIG. 5F are screen captures of examples of displays that may be implemented in an embodiment of the computing system of FIG. 1. FIG. 5D illustrates the dynamic, online placement of a tone summary window 570 over a content authoring window 560 during user creation of a text sequence that includes text portions 564, 566, 568. Illustratively, content authoring window 560 is part of an electronic messaging software application, and text portions 564, 566, 568 have been entered into a body portion 562 of an electronic message.

In an embodiment of tone detection system 160, tone summary window 570 appears in response to system 160 detecting an end-of-document signal in body portion 562 and prior to the user selecting a "send" element to initiate sending the electronic message. Tone summary window 570 displays graphical tone indicators and tone labels for the top k tones detected across all of the text portions 564, 566, 568. Tone summary window 570 includes text 572, which asks the user to provide feedback on each of the displayed tone labels, using a rating such as a "star" rating as shown, or by recording a "thumbs up" or "thumbs down" vote. User feedback received in response to tone summary window 570 can be used to train or adapt a tone detection model by a reinforcement learning process, as described above.

FIG. 5E illustrates an embodiment 580 of tone summary window 570 in which ratings 582, 583, 585 may be indicative of the tone detection system's statistical or probabilistic confidence level in the corresponding tone predictions. For example, rating 582 may indicate that the system has determined that it is more statistically likely that document-level tone label 546 applies to text 572, and ratings 583, 585 may indicate that the system has determined that it is less statistically likely that tone labels 547, 549 apply to text 572.

FIG. 5E also illustrates a vote area 587 that includes a number of vote buttons such as buttons 584, 586. A text label 581 may be displayed when a user, via an input device 588, selects or hovers over a "thumbs up" button 584 while thumbs down button 586 is unselected. A "thumbs up" or "thumbs down" vote may be recorded or not recorded for each document-level tone label 546, 547, 549.

Similarly, FIG. 5F illustrates an embodiment 590 of tone summary window 570 with vote area 587 with thumbs up button 598 already selected for document-level tone label 547 and a selection of thumbs down button 594, rather than thumbs up button 596, being made for document-level tone label 546. Text label 592 indicates the type of vote that will be recorded by the selection of button 594. User feedback such as shown in FIG. 5F is helpful for reinforcement learning particularly because the user feedback provided via the selection of button 594 appears to contradict the system-generated confidence ratings 582, 583.

Example Tone Adjustment Display

Figure 5G:
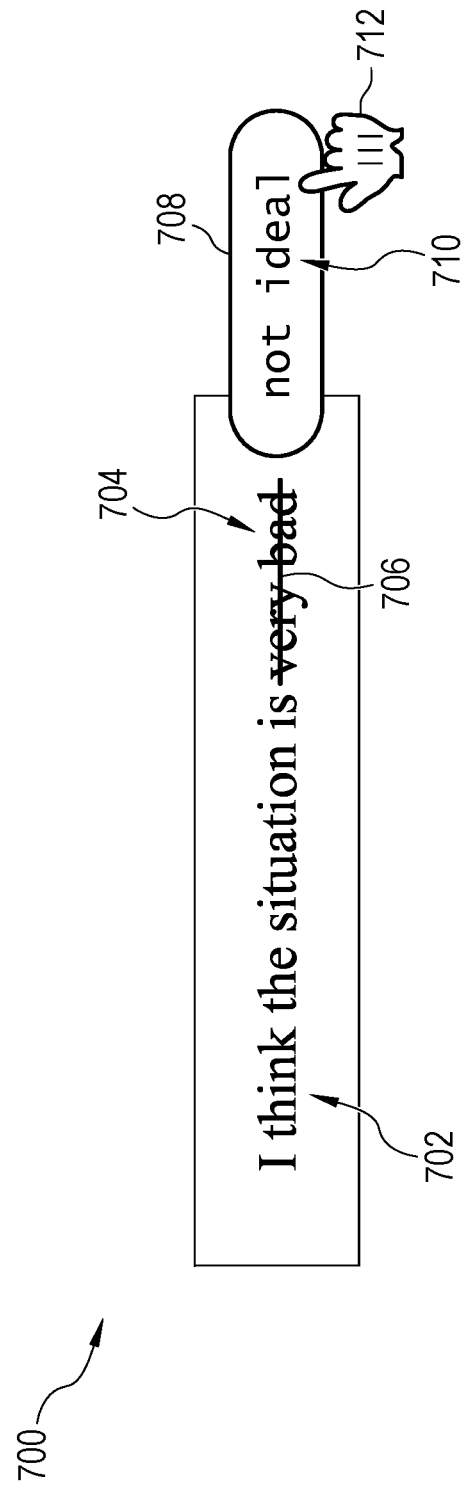

FIG. 5G is a screen capture of an example of a display that may be implemented in an embodiment of the computing system of FIG. 1. In particular, FIG. 5G illustrates an example of a text modification recommendation that may be generated by an embodiment of tone detection system 160 or by GEC system 130 based on data provided by tone detection system 160.

In FIG. 5G, a user has typed a text sequence 702 into a text input window 700. Tone detection system 160 has detected a negative tone based on the "very bad" portion 704 of text sequence 702. In response to the negative tone detection, the disclosed technologies have caused generating and rendering of graphical control element 708, which includes text modification recommendation 710. Additionally, the disclosed technologies have caused the rendering of strikethrough 706 over portion 704. User selection of graphical control element 708 by an input device 712 will cause portion 704 to be replaced with text modification recommendation 710 in text input window 700. In this way, changing text sequence 702 from "I think the situation is very bad" to "I think the situation is not ideal" modifies the tone of text sequence 702.

Implementation Example—Hardware Overview

According to one embodiment, the techniques described herein are implemented by at least one special-purpose computing device. The special-purpose computing device may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, mobile computing devices, wearable devices, networking devices or any other device that incorporates hard-wired and/or program logic to implement the techniques.

Figure 6:
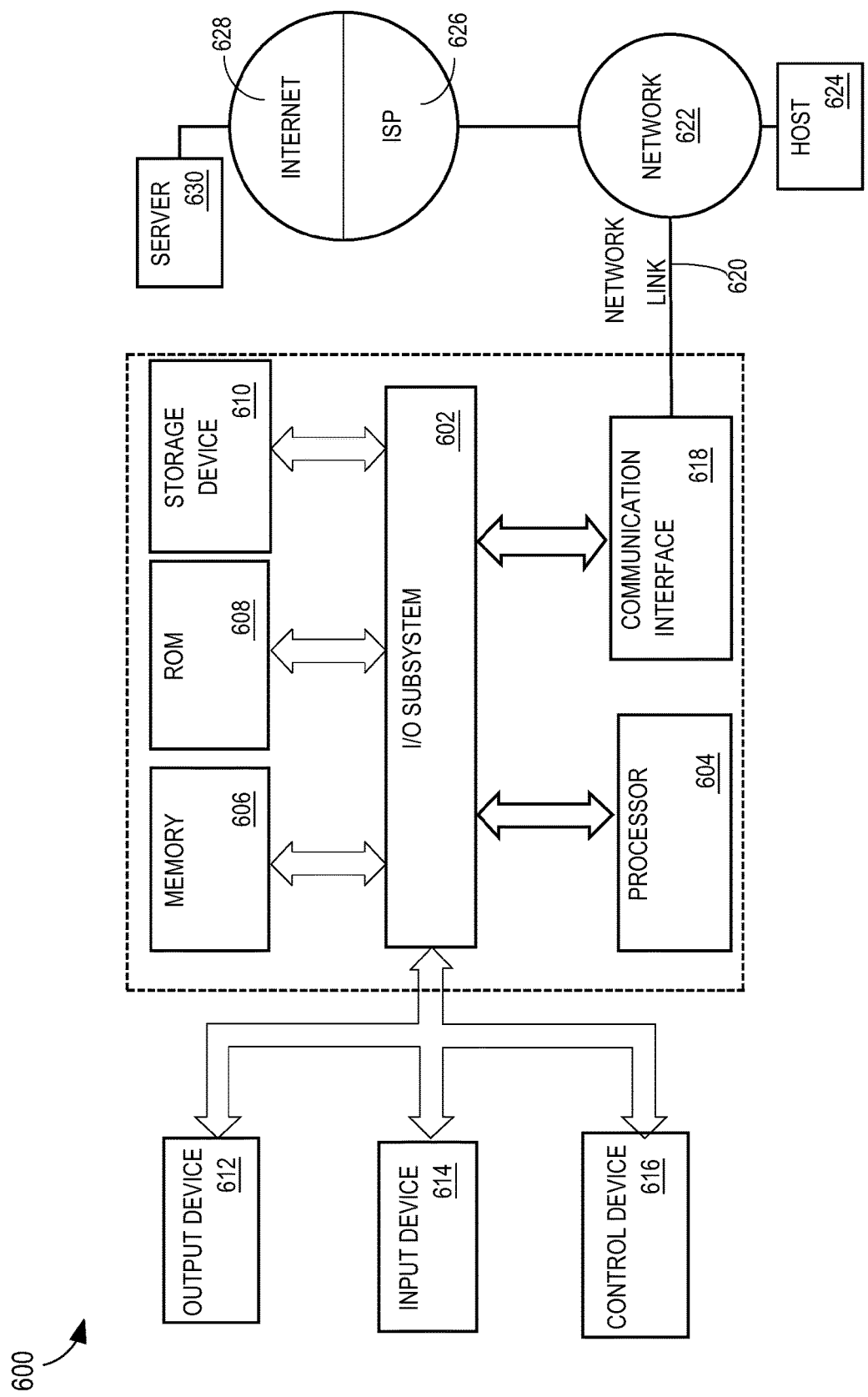
FIG. 6 is a block diagram illustrating at least one embodiment of a hardware system, which may be used to implement various aspects of the computing system of FIG. 1.

For example, FIG. 6 is a block diagram that illustrates a computer system 600 upon which an embodiment of the present invention may be implemented. Computer system 600 includes a bus 602 or other communication mechanism for communicating information, and a hardware processor 604 coupled with bus 602 for processing information. Hardware processor 604 may be, for example, a general-purpose microprocessor.

Computer system 600 also includes a main memory 606, such as random-access memory (RAM) or another dynamic storage device, coupled to bus 602 for storing information and instructions to be executed by processor 604. Main memory 606 also may be used for storing temporary variables or other intermediate information during the execution of instructions to be executed by processor 604. Such instructions, when stored in non-transitory computer-readable storage media accessible to processor 604, render computer system 600 into a special-purpose machine that is customized to perform the operations specified in the instructions.

Computer system 600 further includes a read-only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, at least one ASIC or FPGA, firmware and/or program logic which in combination with the computer system causes or programs computer system 600 to be a special-purpose machine. According to one embodiment, the techniques herein are performed by computer system 600 in response to processor 604 executing at least one sequence of instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire, and fiber optics, including the wires that comprise bus 602. Transmission media can also take the form of acoustic or light waves, such as those generated during radio-wave and infrared data communications.

Various forms of media may be involved in carrying at least one sequence of instructions to processor 604 for execution. For example, the instructions may initially be carried in disk storage of a remote computer. The remote computer can load the instructions into its dynamic memory and send the instructions over a communication line using a modem or another form of network interface. A modem local to computer system 600 can receive the data on the communication line and convert the data to a digital signal. Appropriate circuitry can place the data on bus 602. Bus 602 carries the data to memory 606, from which processor 604 retrieves and executes the instructions. The instructions received by memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated-services digital network (ISDN) card, cable modem, satellite modem, or a modem to provide a data communication connection to a corresponding type of communication line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through at least one network to other data devices. For example, network link 620 may provide a connection through local network 622 to a host computer 624 or to data equipment operated by an Internet Service Provider (ISP)

626. ISP 626 in turn provides data communication services through the worldwide packet data communication network commonly referred to as the "Internet" 628. Local network 622 and Internet 628 both use electrical, electromagnetic, or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620, and communication interface 618. In the Internet example, a server 630 might transmit a requested code for an application program through Internet 628, ISP 626, local network 622 and communication interface 618. The received code may be executed by processor 604 as it is received, and/or stored in storage device 610, or other non-volatile storage for later execution.

ADDITIONAL EXAMPLES

Illustrative examples of the technologies disclosed herein are provided below. An embodiment of the technologies may include any of the examples or a combination of the described below.

In an example 1, a method includes receiving, under digital program control, electronic digital data representing a first text sequence in a first language, the first text sequence including unstructured natural language text; modifying the first text sequence to result in creating and digitally storing a second text sequence in the first language, the modifying including a grammatical error correction including at least one of: deleting text from the first text sequence; adding text to the first text sequence; modifying text of the first text sequence; reordering text of the first text sequence; adding a digital markup to the first text sequence, associating a graphical control element indicative of a tone with the first text sequence; the tone being predicted by inputting syntactic structure data for the first text sequence into a machine-learned model, the machine-learned model producing output used to compute a score associated with the tone and the first text sequence; causing outputting of the second text sequence in the first language.

An example 2 includes the subject matter of example 1, further including using dependency relation data associated with a word pair of the first text sequence or a phrase of the first text sequence to compute the score, the dependency relation data determined from the syntactic structure data for the first text sequence. An example 3 includes the subject matter of example 1 or example 2, further including using dependency relation data associated with a word pair of the first text sequence to reverse the tone of the first text sequence, the dependency relation data determined from the syntactic structure data for the first text sequence. An example 4 includes the subject matter of any of examples 1-3, further including using modifier relation data associated with a word pair of the first text sequence or a phrase of the first text sequence to increase or decrease a score associated with the tone, the modifier relation data determined from the syntactic structure data for the first text sequence. An example 5 includes the subject matter of any of examples 1-4, further including using a digital lexicon to associate at least one word of the first text sequence with a tone label. An example 6 includes the subject matter of example 5, further including using a digital heuristic to associate the syntactic structure data for the first text sequence with a tone label. An example 7 includes the subject matter of any of examples 1-6, further including using the machine-learned model to compute a first score, using a set of digital lexicons to compute a second score, using a set of digital heuristics to compute a third score, and using the first score, the second score, and the third score to predict the tone. An example 8 includes the subject matter of any of examples 1-7, further including modifying the machine-learned model in response to tone selection data received via the graphical control element. An example 9 includes the subject matter of any of examples 1-8, further including causing outputting of a set of graphical elements, a graphical element of the set of graphical elements indicative of a candidate tone of a set of candidate tones, receiving tone selection data corresponding to at least one candidate tone of the set of candidate tones, and using the tone selection data to modify the machine-learned model. An example 10 includes the subject matter of any of examples 1-9, further including causing outputting of a set of tone labels, a tone label of the set of tone labels indicative of a candidate tone of a set of candidate tones, the candidate tone determined using an anti-bias mechanism.

In an example 11, a computer-implemented method includes receiving, via a graphical user interface, digital data including a text sequence; detecting an end of sentence signal in the digital data; extracting a set of features from a first portion of the text sequence, the first portion preceding the end of sentence signal, the set of features including dependency relation data associated with word pairs of the first portion of the text sequence; using the set of features, at least one machine-stored rule and a first machine-learned model, computing a set of sentence-level tone scores for the first portion of the text sequence that precedes the end of sentence signal, a sentence-level tone score indicative of a presence or absence of a particular tone in the first portion of the text sequence; detecting an end of document signal in the digital data; using the set of sentence-level tone scores and at least one second machine-learned model, computing a set of document-level tone scores for a second portion of the text sequence that precedes the end of document signal and includes the first portion of the text sequence, a document-level tone score indicative of a presence or absence of a particular tone in the second portion of the text sequence; causing displaying, on the graphical user interface, a set of tone labels corresponding to the set of document-level tone scores and at least one graphical control element.

An example 12 includes the subject matter of example 11, further including, in response to an input received via the at least one graphical control element, modifying the first machine-learned model. An example 13 includes the subject matter of example 11 or example 12, further including mapping an input received via the at least one graphical control element to a particular sentence-level tone score and a corresponding portion of the text sequence and securely encoding at least the portion of the text sequence using a hash function to produce an instance of training data, and storing the securely encoded instance of training data in computer memory. An example 14 includes the subject matter of any of examples 11-13, further including using a contextual multi-armed bandit model as the second machine-learned model, including a low-probability tone score in the set of document-level tone scores. An example 15 includes the subject matter of any of examples 11-14, further including using a digital dependency parse tree to determine the set of features. An example 16 includes the subject matter of any of examples 11-15, further including using a logistic regression-based model as the first machine-learned model, adjusting a weight of a particular sentence-level tone score of the set of sentence-level tone scores. An example 17 includes the subject matter of any of examples 11-16, further including using a digital heuristic or a digital lexicon to associate syntactic structure data for the first portion of the text sequence with a tone label. An example 18 includes the subject matter of any of examples 11-17, further including using the first machine-learned model to compute a first sentence-level score, using a set of digital lexicons to compute a second sentence-level score, using a set of digital heuristics to compute a third sentence-level score, and using the first sentence-level score, the second sentence-level score, and the third sentence-level score as inputs to the second machine-learned model. An example 19 includes the subject matter of any of examples 11-18, further including using the set of document-level tone scores to create and digitally store a modification recommendation for the text sequence, the modification recommendation including at least one of: deleting text from the text sequence; adding text to the text sequence; modifying text of the text sequence; reordering text of the text sequence; adding a digital markup to the first portion of the text sequence, adding a graphical control element indicative of a tone of the first portion of the text sequence. An example 20 includes the subject matter of any of examples 11-19, further including providing at least one of the set of sentence-level tone scores or the set of document-level tone scores or the set of tone labels to a grammatical error correction system. In an example 21, a method, system, or apparatus includes any combination of any of the features described in this disclosure and/or shown in any of the drawings.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Any definitions set forth herein for terms contained in the claims may govern the meaning of such terms as used in the claims. No limitation, element, property, feature, advantage or attribute that is not expressly recited in a claim should limit the scope of the claim in any way. The specification and drawings are to be regarded in an illustrative rather than a restrictive sense.

As used herein the terms "include" and "comprise" (and variations of those terms, such as "including," "includes," "comprising," "comprises," "comprised" and the like) are intended to be inclusive and are not intended to exclude further features, components, integers or steps.

Various features of the disclosure have been described using process steps. The functionality/processing of a given process step potentially could be performed in different ways and by different systems or system modules. Furthermore, a given process step could be divided into multiple steps and/or multiple steps could be combined into a single step. Furthermore, the order of the steps can be changed without departing from the scope of the present disclosure.

It will be understood that the embodiments disclosed and defined in this specification extend to alternative combinations of the individual features mentioned or evident from the text or drawings. These different combinations constitute various alternative aspects of the embodiments.

What is claimed is:

1. A computer-implemented method comprising:
using a computer system, receiving, under digital program control, electronic digital data representing a first text sequence in a first language, the first text sequence comprising unstructured natural language text, and the first text sequence being among a plurality of text sequences of a document;
by the computer system, determining syntactic structure data associated with the first text sequence;
by the computer system, inputting the syntactic structure data associated with the first text sequence into a machine-learned model, the machine-learned model producing an output used to compute a first tone score associated with a predicted tone of the first text sequence among the plurality of text sequences of the document, the first tone score specifying a combination of any one or more of: an identity, a polarity, or an intensity of a tone of the first text sequence;
computing a second tone score by using a set of digital lexicons to associate at least one word of the first text sequence with a first tone label;
computing a third tone score by using a set of digital heuristics to associate syntactic structure data with a second tone label;
using the first tone score, the second tone score, and the third tone score to determine the predicted tone of the first text sequence;
modifying the first text sequence to result in creating and digitally storing a second text sequence in the first language, the modifying comprising executing a grammatical error correction determined based on the predicted tone of the first text sequence among the plurality of text sequences of the document, wherein the grammatical error correction includes at least one of: deleting text from the first text sequence in response to the predicted tone; adding text to the first text sequence in response to the predicted tone; modifying text of the first text sequence in response to the predicted tone; reordering text of the first text sequence in response to the predicted tone; adding a digital markup to the first text sequence, or associating a graphical control element indicative of the predicted tone with the first text sequence;
and outputting the second text sequence in the first language to a user system for visual and/or audio presentation.

2. The method of claim 1, further comprising using dependency relation data associated with any of: a word pair of the first text sequence or a phrase of the first text sequence, to compute the first tone score, the dependency relation data determined from the syntactic structure data for the first text sequence.

3. The method of claim 1, further comprising using dependency relation data associated with a word pair of the first text sequence to reverse the tone of the first text sequence, the dependency relation data being determined from the syntactic structure data for the first text sequence.

4. The method of claim 1, further comprising using modifier relation data associated with a word pair of the first text sequence or a phrase of the first text sequence to increase or decrease the first tone score associated with the tone of the first text sequence, the modifier relation data being determined from the syntactic structure data for the first text sequence.

5. The method of claim 1, further comprising using a digital lexicon to associate at least one word of the first text sequence with a tone label.

6. The method of claim 1, further comprising using a digital heuristic to associate the syntactic structure data for the first text sequence with a tone label.

7. The method of claim 1, further comprising modifying the machine-learned model in response to tone selection data received via the graphical control element.

8. The method of claim 1, further comprising causing outputting of a set of graphical elements, a graphical element of the set of graphical elements indicative of a candidate tone of a set of candidate tones, receiving tone selection data corresponding to at least one candidate tone of the set of candidate tones, and using the tone selection data to modify the machine-learned model.

9. The method of claim 1, further comprising causing outputting of a set of tone labels, wherein one tone label of the set of tone labels comprises a less dominant candidate, wherein the less dominant candidate is determined using an anti-bias mechanism.

10. The method of claim 1, the first tone score being computed further based on an emotion that is classified using emotion labels being factors used to predict the tone of the first text sequence.

11. The method of claim 1, the unstructured natural language text being pre-processed before being received by the computer system, the pre-processing comprising dividing the unstructured natural language text into any one or more of words, phrases, chunks, tokens, and n-grams.

12. A computer-implemented method, comprising:
using a computer system receiving, via a graphical user interface, digital data comprising a text sequence;
by the computer system, detecting an end of sentence signal in the digital data;
by the computer system, extracting a set of features from a first portion of the text sequence, the first portion preceding the end of sentence signal, the set of features comprising dependency relation data associated with word pairs of the first portion of the text sequence;
by the computer system, determining a set of sentence-level tone scores for the first portion of the text sequence that precedes the end of sentence signal using a first machine-learned model,
wherein a sentence-level tone score is indicative of a presence or absence of a particular tone in the first portion of the text sequence;
by the computer system, detecting an end of document signal in the digital data;
by the computer system, using the set of sentence-level tone scores and at least one second machine-learned model, computing a set of document-level tone scores for a second portion of the text sequence that precedes the end of document signal and includes the first portion of the text sequence, a document-level tone score indicative of a presence or absence of a particular tone in the second portion of the text sequence; and
using the first machine-learned model to compute a first sentence-level score, using a set of digital lexicons to compute a second sentence-level score, using a set of digital heuristics to compute a third sentence-level score, and using the first sentence-level score, the second sentence-level score, and the third sentence-level score as inputs to the second machine-learned model.

13. The method of claim 12, further comprising mapping an input received via a graphical control element to a particular sentence-level tone score and a corresponding portion of the text sequence, securely encoding at least the corresponding portion of the text sequence using a hash function to produce an instance of training data, and storing the instance of training data in computer memory.

14. The method of claim 12, further comprising using a contextual multiarmed bandit model as the second machine-learned model, including a low-probability tone score in the set of document-level tone scores.

15. The method of claim 12, further comprising using a digital dependency parse tree to determine the set of features.

16. The method of claim 12, further comprising using a logistic regression based model as the first machine-learned model, adjusting a weight of a particular sentence-level tone score of the set of sentence-level tone scores.

17. The method of claim 12, further comprising using a digital heuristic or a digital lexicon to associate syntactic structure data for the first portion of the text sequence with a tone label.

18. The method of claim 12, further comprising using the set of document-level tone scores to create and digitally store a modification recommendation for the text sequence, the modification recommendation comprising at least one of: deleting text from the text sequence; adding text to the text sequence; modifying text of the text sequence; reordering text of the text sequence; adding a digital markup to the first portion of the text sequence, or adding a graphical control element indicative of a tone of the first portion of the text sequence.

19. The method of claim 12, further comprising providing at least one of the set of sentence-level tone scores or the set of document-level tone scores to a grammatical error correction system.

20. The method of claim 1, further comprising:
by the computer system, based at least in part on the first tone score associated with the predicted tone of the first text sequence and tone scores associated with predicted tones of remaining text sequences of the plurality of text sequences of the document, determining a document tone score for a predicted tone of the document;
wherein the modifying of the first text sequence is further based on the document tone score.

* * * * *